United States Patent
Chen et al.

(10) Patent No.: US 7,214,910 B2
(45) Date of Patent: May 8, 2007

(54) ON-CHIP POWER SUPPLY REGULATOR AND TEMPERATURE CONTROL SYSTEM

(75) Inventors: Howard Hao Chen, Yorktown Heights, NY (US); William J. Ferrante, Hyde Park, NY (US); Louis L. Hsu, Fishkill, NY (US); Carl J. Radens, Lagrangeville, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 10/884,933

(22) Filed: Jul. 6, 2004

(65) Prior Publication Data

US 2006/0006166 A1    Jan. 12, 2006

(51) Int. Cl.
*H05B 1/02* (2006.01)

(52) U.S. Cl. ............... 219/494; 219/497; 219/486; 219/485; 307/39

(58) Field of Classification Search ........ 219/209–211, 219/492, 497, 494, 483, 486, 485, 481, 501, 219/505; 307/17, 38–41; 374/172, 178
See application file for complete search history.

(56) References Cited

U.S. PATENT DOCUMENTS

| | | | | |
|---|---|---|---|---|
| 5,619,430 A | * | 4/1997 | Nolan et al. ............... 702/63 |
| 5,639,163 A | * | 6/1997 | Davidson et al. ........... 374/178 |
| 5,784,328 A | * | 7/1998 | Irrinki et al. ............... 365/222 |
| 6,098,409 A | * | 8/2000 | Chase ............................. 62/6 |
| 6,281,760 B1 | | 8/2001 | Koelling et al. |
| 6,411,157 B1 | * | 6/2002 | Hsu et al. ................... 327/536 |
| 6,531,911 B1 | | 3/2003 | Hsu et al. |
| 6,605,988 B1 | * | 8/2003 | Gauthier et al. ............ 327/541 |
| 2005/0083785 A1 | * | 4/2005 | Shiokawa et al. .......... 367/157 |

OTHER PUBLICATIONS

Phillip E. Allen et al. "CMOS Analog Circuit Design", Second Edition; Oxford University Press 2002; pp. 349-357.

* cited by examiner

*Primary Examiner*—Mark Paschall
(74) *Attorney, Agent, or Firm*—Keusey, Tutunjian & Bitetto, P.C.; Rafael Perez-Pineiro, Esq

(57) ABSTRACT

An on-chip temperature control system includes a temperature sensor, which monitors a temperature of a chip, and a hysteresis comparator which checks whether the temperature is in an acceptable range. A reference adjustment circuit is responsive to the hysteresis comparator to adjust an on-chip voltage to control the temperature locally by adjusting a local supply voltage, if the temperature is out of range.

28 Claims, 7 Drawing Sheets

ON-CHIP POWER SUPPLY REGULATOR AND TEMPERATURE CONTROL SYSTEM

BACKGROUND OF THE INVENTION

1. Field of the Invention

The present invention relates generally to on-chip thermal management and, more particularly, to the use of on-chip temperature sensors and power supply voltage regulators to control the power and temperature of integrated circuits.

2. Description of the Related Art

On-chip power and thermal management is one of the most important issues in today's very large integrated circuits (VLSI) design. Conventional semiconductor cooling devices on the chip and chip package cannot effectively dissipate the excessive amount of heat generated by today's high-power circuits. As the circuit feature size continues to shrink and the power density continues to rise, new devices and design techniques are needed to alleviate the on-chip heat dissipation problem.

Furthermore, it has become more difficult to dissipate the heat from the backside of the wafer as the wafer thickness increases from, e.g., 0.7 mm for an 8-inch wafer to 1.0 mm for a 12-inch wafer to provide the mechanical strength needed to support large wafers. The migration from bulk complementary metal oxide semiconductor (CMOS) technology to silicon on insulator (SOI) technology also aggravates the heat dissipation problem by using the buried oxide layer that has a greater thermal resistance than the silicon.

SUMMARY OF THE INVENTION

An on-chip temperature control system includes a temperature sensor, which monitors a temperature of a chip, and a hysteresis comparator which checks whether the temperature is in an acceptable range. A reference adjustment circuit is responsive to the hysteresis comparator to adjust an on-chip voltage to control the temperature locally by adjusting a local supply voltage, if the temperature is out of range.

These and other objects, features and advantages of the present invention will become apparent from the following detailed description of illustrative embodiments thereof, which is to be read in connection with the accompanying drawings.

BRIEF DESCRIPTION OF DRAWINGS

The invention will be described in detail in the following description of preferred embodiments with reference to the following figures wherein.

DETAILED DESCRIPTION OF PREFERRED EMBODIMENTS

The present invention is directed to the regulation of on-chip power supply voltage to control the temperature of high-power integrated circuits. On-chip complementary metal oxide semiconductor (CMOS) temperature sensing circuits are provided to monitor local chip temperature. To regulate the on-chip power supply voltage on a local basis, the on-chip power supply network may be divided into multiple zones, where each zone is a isolated from the other zones, and each zone is independently controlled by its corresponding local regulator. Depending on the circuits and functions that each zone represents, an upper limit and a lower limit of the power supply voltage and thermal temperature are assigned to each power supply zone to prevent circuit performance degradation. When the local chip temperature in a zone exceeds a preset upper limit, the corresponding local power supply voltage will be adjusted lower incrementally, until the lower limit of power supply voltage is reached. Similarly, when the local chip temperature in a zone drops below a preset lower limit, the corresponding local power supply voltage can be adjusted higher incrementally to achieve performance targets.

When the local chip temperature in a zone is maintained between the lower and upper limits, it may not be necessary to adjust the corresponding local power supply voltage.

It should be understood that the elements shown in the FIGS. may be implemented in various forms of hardware, software or combinations thereof. Preferably, these elements are implemented in hardware on one or more integrated circuits and may include software components appropriately programmed using general-purpose digital computers having a processor and memory and input/output interfaces.

Figure 1:
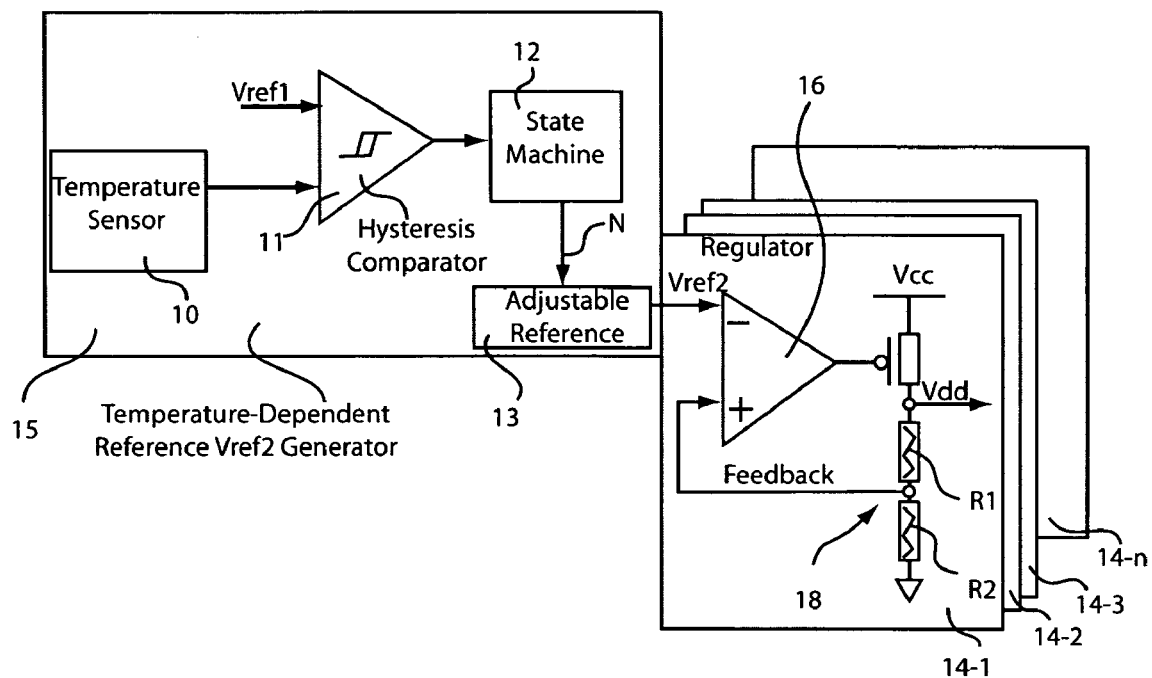
FIG. 1 is a block diagram showing an illustrative architecture and components of an on-chip power supply regulator and temperature control system in accordance with the present invention.

Referring now to the drawings in which like numerals represent the same or similar elements and initially to FIG. 1, a temperature control system 8 includes a temperature-dependent power supply regulation device 15, which comprises a plurality of temperature sensors 10 (e.g., CMOS sensors) to monitor on-chip temperature in each of a plurality of zones or portions of zones (the portions of zones corresponding to regulator circuits 14-1 to 14-n, for example). An output voltage of temperature sensor 10 is sent to a hysteresis comparator 11, where an upper hysteresis threshold is set to represent an upper temperature limit and a lower hysteresis threshold is set to represent a lower temperature limit.

When the output voltage of temperature sensor 10 exceeds the upper threshold, the hysteresis comparator 11 generates a logic "high". When the output voltage of temperature sensor 10 drops below the lower threshold, the hysteresis comparator 11 generates a logic "low". If the on-chip temperature is within its acceptable range, the output voltage of temperature sensor 10 will be within the range of two threshold levels, and the hysteresis comparator 11 will not change the state of its output.

The output of the hysteresis comparator 11 is sent to a bi-directional shift register or state machine 12. In one example, when a logic "high" is received, the register 12 shifts downward by one bit, unless the least significant bit (LSB) is reached. When a logic "low" is received, the register 12 will shift upward by one bit, unless the most significant bit (MSB) is reached. The LSB and MSB represent the lowest and highest levels of adjustable power supply voltage. Shift register 12 controls, e.g., a variable resistor (see FIG. 7) in an adjustable reference voltage unit 13, which in turn changes a power supply voltage via a regulator 14 using an amplifier 16.

The output of the bi-directional shift counter 12 can switch CMOS gates that provide digital control of reference voltage levels. The LSB defines the lowest power supply voltage level in the zone, and the MSB defines the highest power supply voltage level in the zone. For example, for an 8-bit register counter, the power supply voltage can be adjusted to 8 different levels that may differ by as much as a few hundred millivolts, based on the sensed temperatures.

Preferred embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the invention to those skilled in the art.

An on-chip temperature control system 8 includes a temperature-sensing unit 10, a hysteresis comparator unit 11, state machine logic 12, an adjustable reference generator 13, and a power supply regulator 14 as described above. The on-chip temperature-sensing unit 10 measures the local chip temperature and sends a signal to the hysteresis comparator unit 11. The hysteresis comparator unit 11 compares the incoming signal with a preset reference voltage Vref1 that corresponds to a nominal chip temperature or zone temperature.

When the detected temperature is higher than the nominal temperature plus a margin, it will trigger the comparator 11 to generate a positive output. When the detected temperature is lower than the nominal temperature minus a margin, it will trigger the comparator 11 to generate a negative output. The temperature margin may be built into the hysteresis comparator 11 as the hysteresis threshold level, which determines the maximum and minimum desirable chip temperature.

In the present embodiment, it may not be possible to adjust the chip temperature to the desirable range, due to performance constraints that limit the adjustment of power supply voltage. However, this may be resolved by adding more adjustment and greater temperature range control.

The output of the comparator 11 is sent to the state machine unit 12, which determines the amount of power supply voltage adjustment and sets a variable resistor in adjustable reference generator 13. The state machine unit 12 can be replaced by a bi-directional shift counter or register to determine the amount of power supply voltage adjustment. The adjustable reference unit 13 generates a reference voltage Vref2, which will be used by power supply regulator 14 to set a local power supply voltage. The power supply voltage regulator 14 preferably includes a differential amplifier 16 and a feedback control stage 18 to regulate the local power supply voltage Vdd, according to the reference voltage Vref2 generated by the adjustable reference generator 13.

In one embodiment, the voltage level cannot go beyond its high and low limits, which are fixed by the reference generator and will be discussed in greater detail below.

A plurality of different temperature sensor devices and measurement schemes may be employed to implement the present invention. A few temperature sensor systems are illustratively described hereinbelow. Other temperature sensors may also be employed in accordance with the teachings of the present invention.

Figure 2:
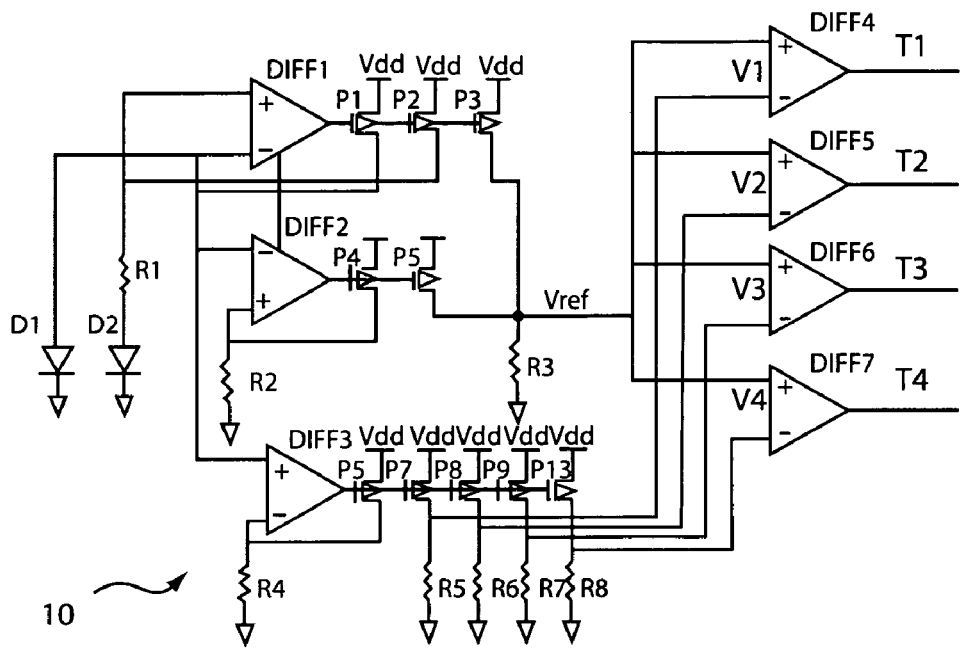
FIG. 2 is a schematic diagram of a prior art temperature sensor, which may be employed in accordance with the system of the present invention.

Referring to FIG. 2, one illustrative implementation of a CMOS temperature sensor 10 described, e.g., in commonly assigned U.S. Pat. No. 6,531,911, entitled "Low power band-gap reference and temperature sensor circuit," issued on Mar. 11, 2003, and incorporated herein by reference, uses a temperature-dependent term of a band-gap reference circuit to form the temperature sensor.

Figure 3:
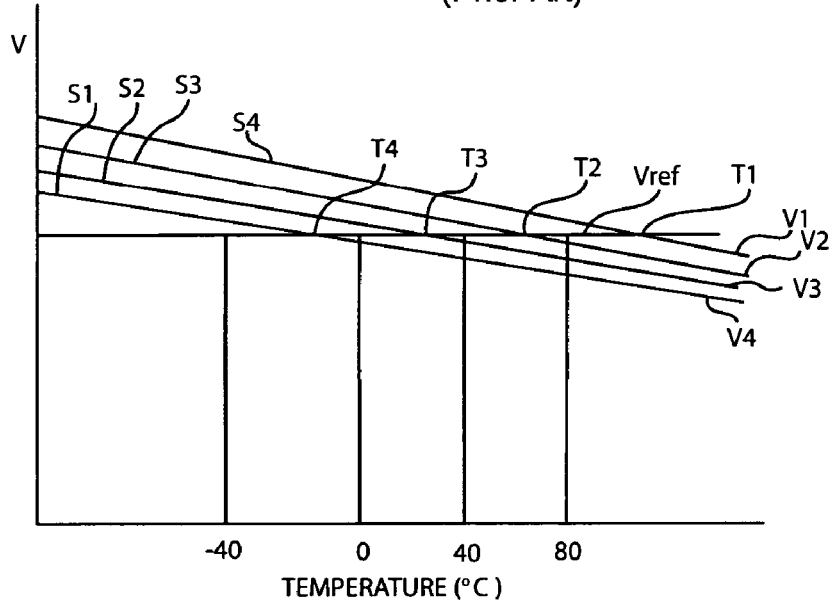
FIG. 3 is a plot of voltage output versus temperature for the design of the temperature sensor of FIG. 2.

As shown in FIG. 3, while the temperature coefficients of T1, T2, T3, and T4 are about the same, the temperature sensor of FIG. 2 can be designed with various voltage levels by properly selecting the different resistors R5, R6, R7, and R8.

Other implementations of on-chip temperature sensing systems include U.S. Pat. No. 5,619,430, entitled "Microcontroller with on-chip linear temperature sensor," issued on Apr. 8, 1997 and incorporated herein by reference, where a microcontroller for use in battery charging and monitoring applications is disclosed. The temperature sensor generates and uses a differential voltage that is proportional to temperature and may be sampled by an analog/digital (A/D) converter to monitor the temperature of the microcontroller.

In commonly assigned U.S. Pat. No. 5,639,163, entitled "On-chip temperature sensing system," issued on Jun. 17, 1997, and incorporated herein by reference, a pair of on-chip thermal sensing diodes are formed and connected to a high-impedance amplifier. In U.S. Pat. No. 5,784,328, entitled "Memory system including an on-chip temperature sensor for regulating refresh rate of a DRAM array," issued on Jul. 21, 1998, and incorporated herein by reference includes a DRAM memory array including a temperature sensor for adjusting a refresh rate depending upon temperature. By controlling the refresh rate dependent upon the temperature of the semiconductor die, proper state retention is ensured within each of the memory cells while allowing performance to be optimized.

In U.S. Pat. No. 6,281,760, entitled "On-chip temperature sensor and oscillator for reduced self-refresh current for dynamic random access memory," issued on Aug. 28, 2001, and incorporated herein by reference, a temperature dependent clock circuit is disclosed, where a frequency controllable oscillator circuit provides an output clock signal having a frequency that is dependent upon the values of the bias signals representative of the operating temperature of the clock circuit. In U.S. Pat. No. 6,605,988 "Low voltage temperature-independent and temperature-dependent voltage generator," issued on Aug. 12, 2003, and incorporated herein by reference, an apparatus that uses a low voltage power supply to generate a temperature independent voltage and temperature-dependent voltage is provided.

Figure 4:
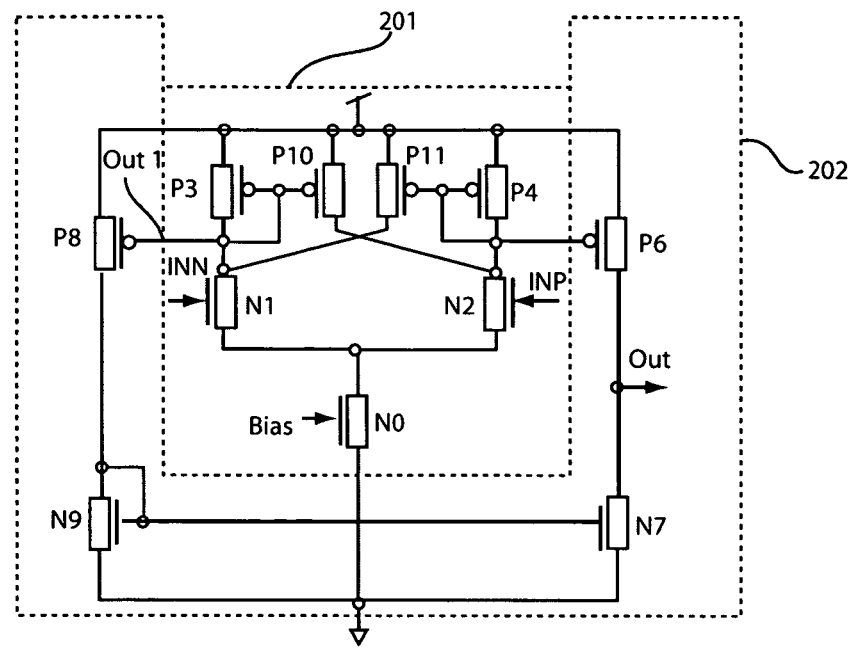
FIGS. 4 and 5 show an illustrative design of a hysteresis comparator and its transfer function, which may be employed in accordance with the present invention.

The hysteresis comparator 11 of FIG. 1 may be implemented in a plurality of different ways. One illustrative hysteresis comparator is illustratively shown in FIG. 4. FIG. 4 shows an exemplary implementation of the hysteresis comparator (see e.g., *CMOS Analog Circuit Design*, by Phillip E. Allen and Douglas R. Holberg, pp. 349–357, incorporated herein by reference).

Transistors P3, P4, P10, P11, N0, N1 and N2 form a differential input stage 201 of the hysteresis comparator 11. Transistors P6, P8, N7 and N9 form the output stage 202 of the hysteresis comparator 11. The current-series feedback is a negative feedback path through the common source node of transistors N1 and N2. The voltage-shunt feedback is a positive feedback path through gate-drain connection of transistors P10 and P11.

If the positive feedback factor is less than the negative feedback factor, the overall feedback will be negative, which results in no hysteresis. The hysteresis level can be adjusted by controlling transconductance ratios of P10/P3 and P11/P4. If the transconductance ratio is less than or equal to one, the circuit will behave like a pure comparator. If the transconductance ratios of P10/P3 and P11/P4 are greater than 1, the comparator will have built-in positive and negative hysteresis threshold levels.

Figure 5:
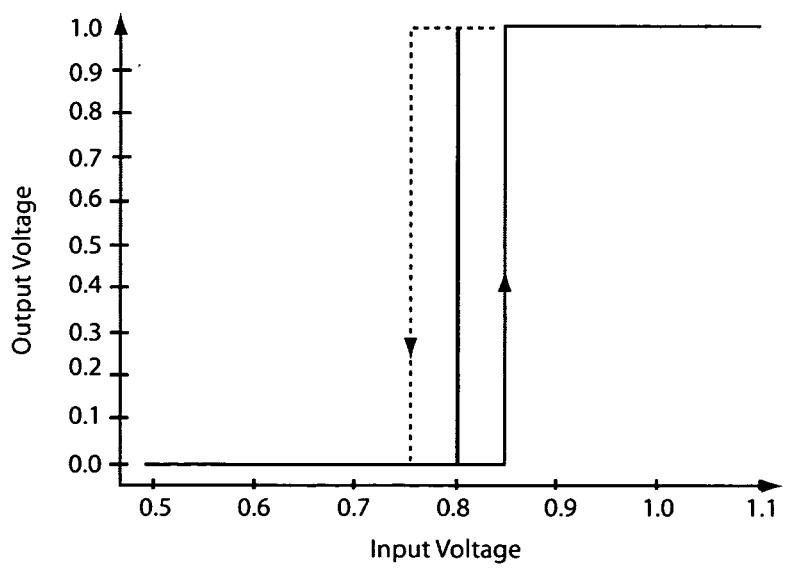

Referring to FIG. 5, a simulation result of a hysteresis comparator 11 whose reference level is set at 0.8V is illustratively shown. When the incoming signal from the temperature sensor exceeds 0.85V, the upper threshold, the output will change from low to high. Similarly, if the incoming signal from the temperature sensor is below 0.75V, the lower threshold, the output will swing from high to low. Therefore, if the on-chip temperature is above the upper limit or below the lower limit, it will trigger a change of output in the hysteresis comparator 11.

Figure 6:
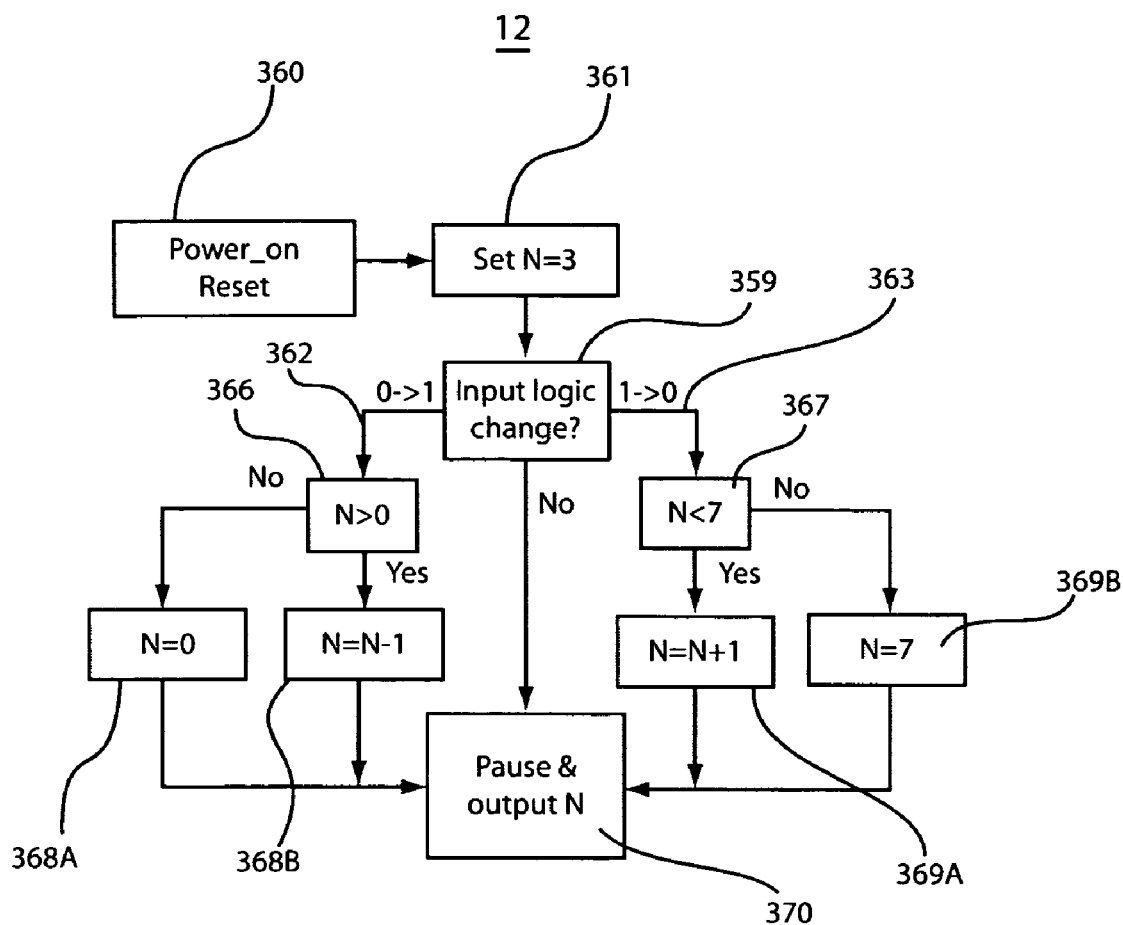
FIG. 6 is a block/flow diagram showing logic of a state machine in accordance with one embodiment of the present invention.

Referring to FIG. 6, a state machine 12 is illustratively shown for controlling the incremental power supply adjustment. During chip power-on, a reset signal 360 will set the initial condition of the state machine 12 to its nominal setting in block 361, e.g., N=3, if the on-chip temperature is maintained within the nominal levels. N is a register position, dial setting or any other indicator of states, which can be used to set or change the setting of a reference. When the temperature detected by the sensor 10 (FIG. 1) increases above the high temperature limit or decreases below the low temperature limit, the hysteresis comparator 11 (FIG. 1) will change its output and send a logic "1" or logic "0" to the state machine 12.

After the input changes its state, the state machine 12 determines, in block 359, the path that will be taken. If logic changes from 0 to 1 path 362 is taken, and if the logic changes from 1 to 0 path 363 is taken. The state machine 12 then determines if the current power supply voltage is within its adjustable limit using block 366 and 367. In block 366, if N>0, N=N−1 in block 368B, otherwise N=0 in block 368A. If the current state is N=0, the power supply voltage has reached its lower limit and cannot be decreased any further. If N<7 as decided in block 367, then N=N+1 in block 369A, otherwise N=7 in block 369B (7 is representative of a highest setting value and may be any value, 7 is employed here for illustrative purposes only). If the current value is N=7, the power supply voltage has reached its upper limit and cannot be increased any further.

In one example, if the input logic switches from "0" to "1" and the current state N is between 0 and 6, then the next state can be incremented by 1 to increase the power supply voltage to a higher level. If the input logic switches from "1" to "0" and the current state N is between 1 and 7, then the next state can be decremented by 1 to decrease the power supply voltage to a lower level.

To ensure the stability of power supply voltage and avoid potential ringing problems, the state machine 12 may include a built-in pause period in block 370. The pause period is provided when a change of state is to take place.

Figure 7:
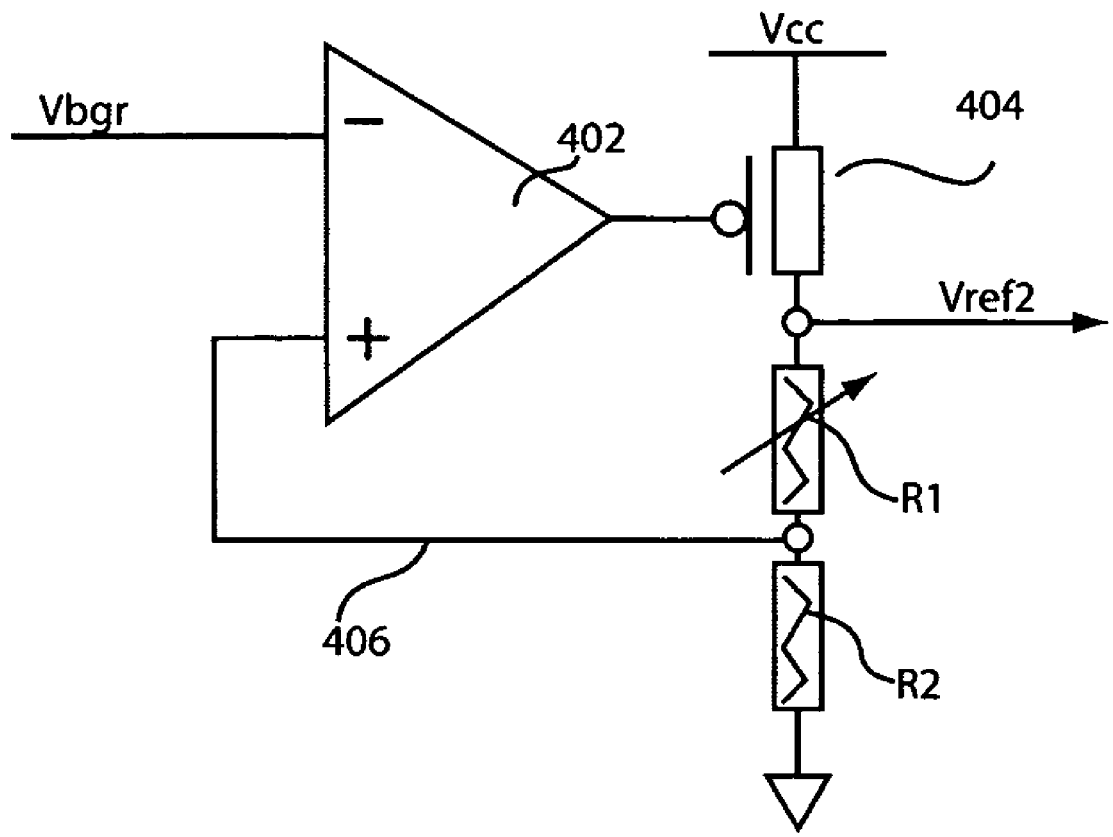
FIG. 7 schematic diagram of an adjustable reference voltage unit in accordance with one embodiment of the present invention.

Referring to FIG. 7, an adjustable voltage reference unit or regulator circuit 13 is illustratively shown, where a band-gap reference circuit (not shown) sets an input reference voltage Vbgr to a differential amplifier 402. Vcc is the supply voltage. The output (N) of state machine 12 tunes a variable resistor R1 and generates a temperature-dependent output reference voltage Vref2=Vbgr*(R1+R2)/R2 for a power regulator 14 (FIG. 1). A CMOS gate 404 is activated in accordance with the output from amplifier 402, which depends on the input values of a feedback path 406 and Vbgr to the differential amplifier 402. Circuits 14 of FIG. 1 work in a similar fashion. However, the input to regulator 14 is Vref2 and the output is a supply voltage Vdd (instead of Vref2) to a chip or zone of a chip.

Figure 8:
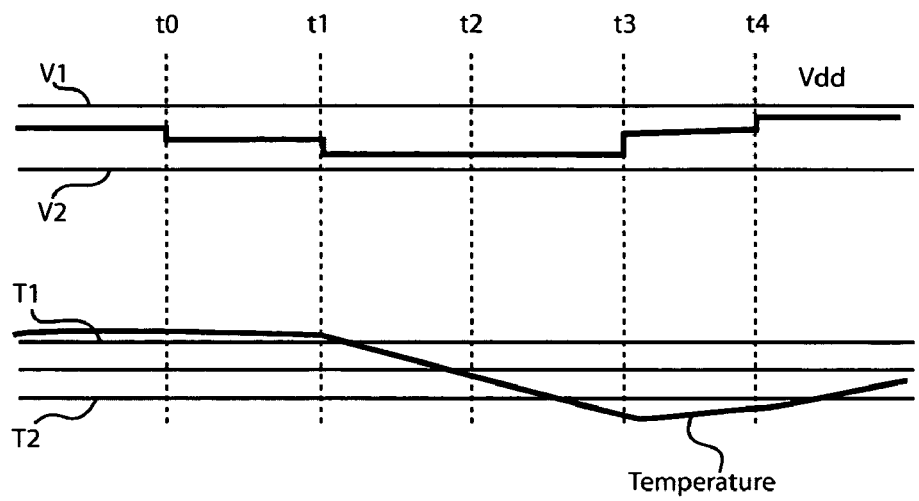
FIG. 8 is a plot that illustratively shows an on-chip temperature variation and its corresponding power supply voltage adjustment in accordance with the present invention.

Referring to FIG. 8, an illustrative plot of voltage V and temperature T for discrete time t is illustratively shown for the adjustment of a power supply voltage due to on-chip temperature variation. The regulated power supply voltage is controlled between V1 and V2 by circuit 14 (FIG. 1) to satisfy circuit performance requirements. Supply voltage Vdd is incrementally adjusted in accordance with temperature variations. No power supply voltage (Vdd) adjustment is necessary when the on-chip temperature is within its acceptable range between T1 and T2.

Figure 9:
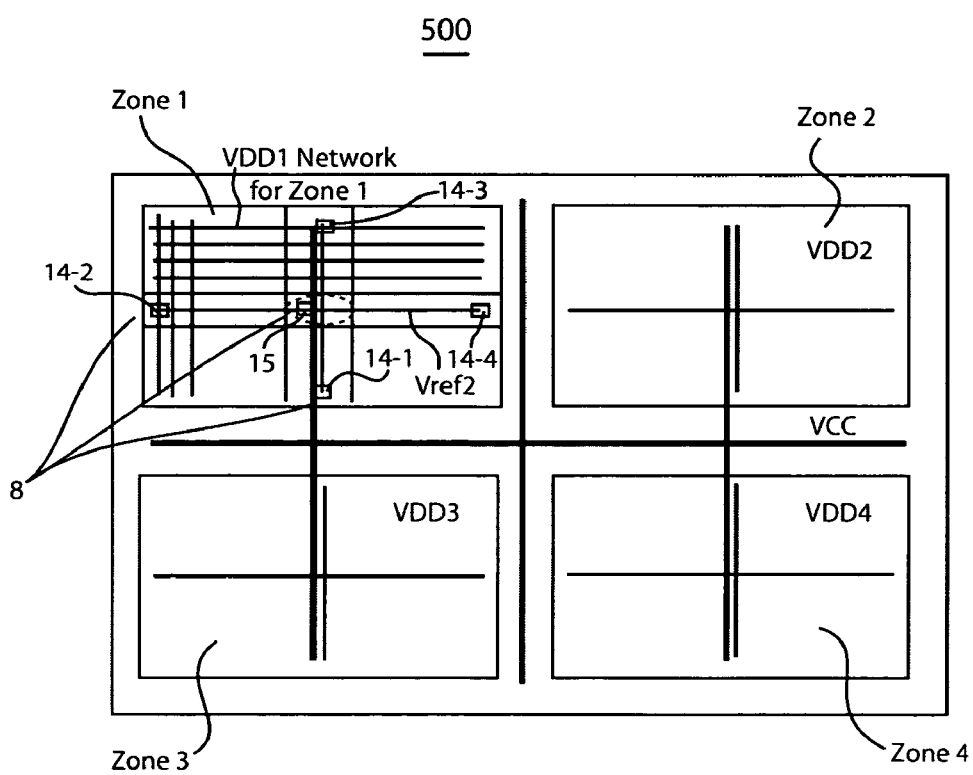
FIGS. 9 and 10 show implementations of a power supply regulator and temperature control system on a memory chip and a processor chip, respectively, in accordance with embodiments of the present invention.

Referring to FIG. 9, an illustrative implementation of a temperature control system 8 on a high-density memory chip 500, where many identical arrays are present, is shown in accordance with one embodiment of the present invention. The chip 500 may be partitioned into 1 or more zones (e.g., zones 1–4) and be powered by independent power supplies for each zone. A global power supply Vcc is routed to each of zones 1–4 of the chip 500 and connected to local power supply regulator control units 14-1 to 14-4. The local power supply regulators 14 in turn generate the temperature-dependant local power supply voltages Vdd1, Vdd2, Vdd3, and Vdd4 for zone 1, zone 2, zone 3, and zone 4 respectively.

Depending on the application and operation modes, local power supply voltages Vdd can be set at the same level or different levels in accordance with temperature-dependent power supply regulation device 15. Each local power supply regulator 14 is then adjusted dynamically to meet its power demand and control the local temperature.

Note that more or less local power supplies may be employed to provide better control of temperature over particular areas of chip 500. For example, active areas and hot spots may include more circuits 14 to provide better control. However, this should be balanced against density and heat dissipation requirements and other considerations.

Figure 10:
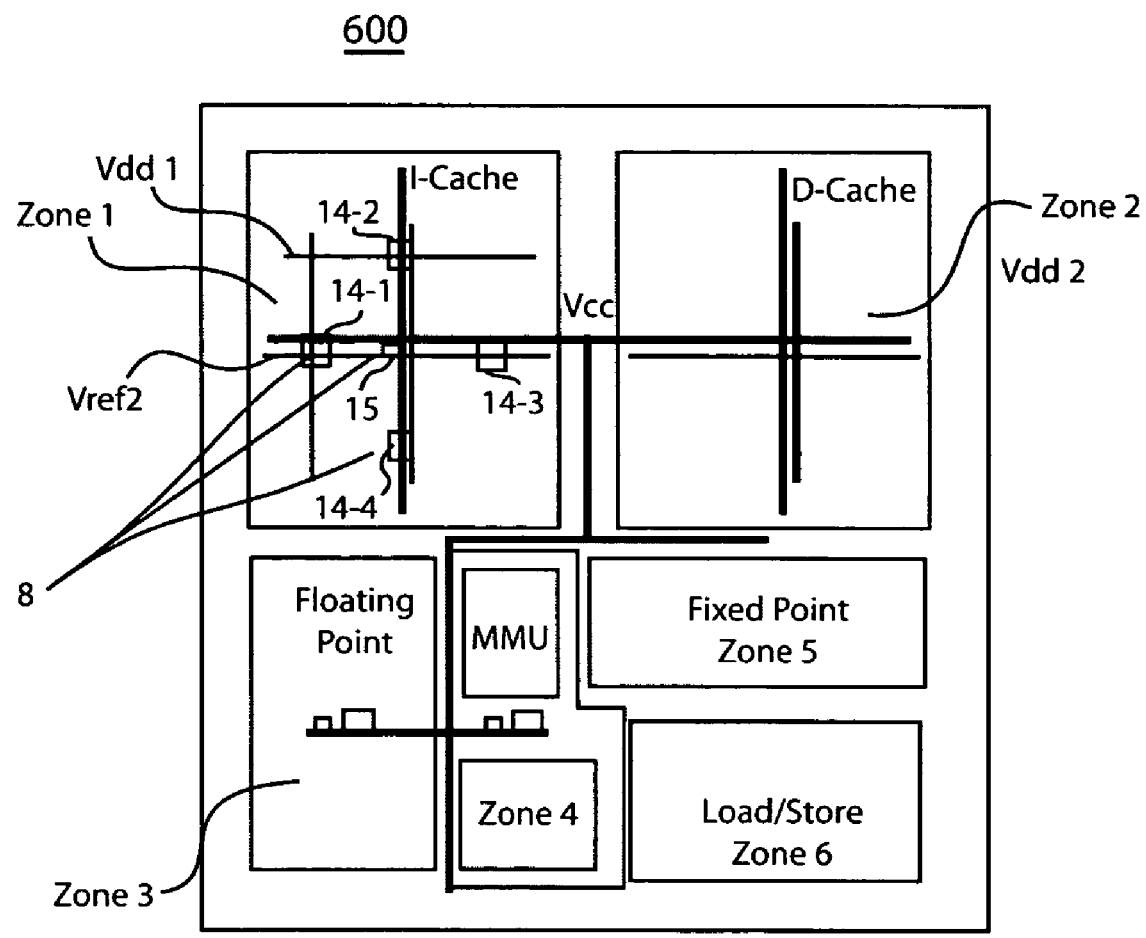

Referring to FIG. 10, one illustrative implementation of a temperature control system 8 is shown on a high-power processor chip 600 in accordance with another embodiment of the present invention. Chip 600 may be partitioned into one or more zones to provide better control of temperature across chip 600. For simplicity, only an I-Cache unit (zone 1), a D-Cache unit (zone 2), a Floating-Point unit (zone 3), Fixed-Point unit (zone 5), and Load/Store unit (zone 6) are shown, although the actual partition may vary by design. Other zones (zone 4) may also be included. For example, local power supply voltages Vdd can be set at different levels for core logic, Input/Output circuit, and other voltage island applications. These can also be controlled individually to meet performance and thermal requirements using system 8, as described above.

The location and number of circuit 14 (and 15) may vary from design to design or application to application. It is to be understood that circuit 14 and 15 of system 8 are integrated into chips 500 and 600. In other words, system 8 is built directly into the integrated circuit chips and its functions and use are incorporated into the design and manufacturing on the chip.

Having described preferred embodiments of a on-chip power supply regulator and temperature control system (which are intended to be illustrative and not limiting), it is noted that modifications and variations can be made by persons skilled in the art in light of the above teachings. It is therefore to be understood that changes may be made in the particular embodiments of the invention disclosed which are within the scope and spirit of the invention as outlined by the appended claims. Having thus described the invention with the details and particularity required by the patent laws, what is claimed and desired protected by Letters Patent is set forth in the appended claims.

What is claimed is:

1. An on-chip temperature control system, comprising:
   a temperature sensor integrated in a chip, which monitors a temperature of the chip;
   a hysteresis comparator integrated in the chip and configured to check whether the temperature is in an acceptable range; and
   a reference adjustment circuit integrated in the chip and being responsive to the hysteresis comparator to adjust an on-chip supply voltage to integrated circuit components to control the temperature locally on the chip by adjusting the integrated circuit component performance, if the temperature is out of range.

2. The system as recited in claim 1, further comprising a state machine, which determines a new state responsive to the output of the hysteresis comparator.

3. The system as recited in claim 2, wherein the state machine outputs a discrete value and the reference adjustment circuit adjusts a voltage in accordance with the value to counteract out of range temperatures.

4. The system as recited in claim 1, wherein the reference adjustment circuit includes one or more adjustable voltage reference circuits, which generate a local supply voltage to affect the temperature of the chip.

5. The system as recited in claim 1, wherein the reference adjustment circuit outputs a voltage, which indicates a temperature state of the chip.

6. The system as recited in claim 1, wherein the hysteresis comparator includes an upper threshold and a lower threshold and outputs a signal to indicate a direction and magnitude for temperature adjustment.

7. The system as recited in claim 1, wherein the reference adjustment circuit includes a variable resistor, which is tuned to output a voltage to counteract out of range temperatures.

8. The system as recited in claim 1, wherein the reference adjustment circuit includes a plurality of local regulator circuits, which regulate supply voltages locally on the chip in accordance with local temperatures.

9. An on-chip temperature control system, comprising:
   an integrated circuit having a plurality of zones;
   a temperature-dependent power supply regulation system integrated in the integrated circuit, including:
      a temperature sensor located in each zone of the integrated circuit, which monitors temperatures of that zone;
      a hysteresis comparator configured to check whether the temperature for that zone is in an acceptable range; and
      a reference adjustment circuit being responsive to the hysteresis comparator to adjust a local supply voltage for integrated circuit components to regulate performance of the integrated circuit components in that zone in accordance with the temperature, if the temperature is out of range.

10. The system as recited in claim 9, further comprising a state machine, which determines a new state responsive to the output of the hysteresis comparator.

11. The system as recited in claim 10, wherein the state machine outputs a discrete value and the reference adjustment circuit adjusts a voltage in accordance with the value to counteract out of range temperatures.

12. The system as recited in claim 9, wherein the reference adjustment circuit includes one or more adjustable voltage reference circuits, which generate a local supply voltage to affect the temperature of the integrated circuit.

13. The system as recited in claim 9, wherein the reference adjustment circuit outputs a voltage, which indicates a temperature state of the integrated circuit.

14. The system as recited in claim 9, wherein the hysteresis comparator includes an upper threshold and a lower threshold and outputs a signal to indicate a direction and magnitude for temperature adjustment.

15. The system as recited in claim 9, wherein the reference adjustment circuit includes a variable resistor, which is tuned to output a voltage to counteract out of range temperatures.

16. The system as recited in claim 9, wherein the reference adjustment circuit includes a plurality of local regulator circuits within a single zone, which regulate supply voltages locally on the integrated circuit in accordance with local temperatures.

17. The system as recited in claim 9, wherein the system is included on a memory chip.

18. The system as recited in claim 9, wherein the system is included on a processor chip.

19. An integrated circuit, comprising:
    one or more zones;
    each zone comprising a temperature-dependent power supply regulation system including:
       a temperature sensor located in a respective zone, which monitors temperatures of that zone;
       a hysteresis comparator located in the integrated circuit and configured to check local temperatures in the zones to determine if the temperature is in an acceptable range; and
       a plurality of reference adjustment circuits located in each zone and responsive to the hysteresis comparator to adjust local supply voltages for integrated circuit components in that zone to regulate performance of the integrated circuit components in accordance with the temperature, if the temperature is out of range.

20. The circuit as recited in claim 19, further comprising a state machine, which determines a new state responsive to the output of the hysteresis comparator.

21. The circuit as recited in claim 20, wherein the state machine outputs a discrete value and the reference adjustment circuits adjust a voltage in accordance with the value to counteract out of range temperatures.

22. The circuit as recited in claim 19, wherein the reference adjustment circuits include one or more adjustable voltage reference circuits, which generate a local supply voltage to affect the temperature of the chip.

23. The circuit as recited in claim 19, wherein each reference adjustment circuit outputs a voltage, which indicates a temperature state of the integrated circuit.

24. The circuit as recited in claim 19, wherein the hysteresis comparator includes an upper threshold and a lower threshold and outputs a signal to indicate a direction and magnitude for temperature adjustment.

25. The circuit as recited in claim 19, wherein each reference adjustment circuit includes a variable resistor, which is tuned to output a voltage to counteract out of range temperatures.

26. The circuit as recited in claim 19, wherein each reference adjustment circuit regulates supply voltages locally on the integated circuit in accordance with local temperatures.

27. The circuit as recited in claim 19, wherein the circuit includes a memory chip.

28. The circuit as recited in claim 19, wherein the circuit includes a processor chip.

\* \* \* \* \*